US011953431B2

(12) United States Patent
Steenhoek

(10) Patent No.: US 11,953,431 B2
(45) Date of Patent: Apr. 9, 2024

(54) MEASURING A COLOR OF A TARGET COATING

(71) Applicant: AXALTA COATING SYSTEMS IP CO., LLC, Wilmington, DE (US)

(72) Inventor: Larry E. Steenhoek, Media, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 81 days.

(21) Appl. No.: 17/643,875

(22) Filed: Dec. 13, 2021

(65) Prior Publication Data

US 2022/0187198 A1    Jun. 16, 2022

Related U.S. Application Data

(60) Provisional application No. 63/125,484, filed on Dec. 15, 2020.

(51) Int. Cl.
     *G01N 21/31*      (2006.01)
(52) U.S. Cl.
     CPC ..................... *G01N 21/31* (2013.01)
(58) Field of Classification Search
     CPC ....................................................... G01N 21/31
     See application file for complete search history.

(56) References Cited

U.S. PATENT DOCUMENTS

| | | | | |
|---|---|---|---|---|
| 8,917,962 | B1 * | 12/2014 | Nichol | G02B 6/0028 362/311.03 |
| 9,418,416 | B2 * | 8/2016 | Milne | G01N 21/8851 |
| 11,137,344 | B2 * | 10/2021 | Kusters | G01N 21/251 |
| 11,473,976 | B2 * | 10/2022 | Schwab | G01J 3/10 |
| 2022/0120614 | A1 | 4/2022 | Mundus et al. | |

FOREIGN PATENT DOCUMENTS

| CN | 1728184 A * | 2/2006 | .......... G07D 7/1205 |
|---|---|---|---|
| WO | 2020169678 A1 | 8/2020 | |

OTHER PUBLICATIONS

Eric Kirchner et al., Making Sense Of Measurement Geometries For Multi-Angle Spectrophotometers, Color Research & Application, Jul. 13, 2011, pp. 189-198, vol. 37, No. 3.
Feng Heng et al., Color Prediction Of Metallic Coatings From Measurements At Common Geometries In Portable Multiangle Spectrophotometers, Journal Of Coatings Technology And Research, Feb. 15, 2022, pp. 957-966, vol. 15, No. 5, Springer New York LLC, US.

* cited by examiner

*Primary Examiner* — Michelle M Iacoletti
*Assistant Examiner* — Kemaya Nguyen
(74) *Attorney, Agent, or Firm* — Lorenz & Kopf, LLP

(57) ABSTRACT

Devices and methods for measuring color of a target coating are provided. In an exemplary embodiment, a color measurement device includes a housing configured for placement on a target coating. A source connected to the housing directs a beam of electromagnetic radiation towards the target coating at an entrance angle. A spherical coordinate system is used, where the entrance angle is a polar angle measured from a zenith that is normal to the target coating surface. First and second detectors are connected to the housing at a first and second polar angle, respectively, to measure the electromagnetic radiation reflected by a target population of flakes within the target coating, where all the flakes in the target population of flakes have the same angled flake normal polar angle. The first polar angle is different than the second polar angle.

19 Claims, 8 Drawing Sheets

MEASURING A COLOR OF A TARGET COATING

PRIORITY CLAIM

This application claims priority to U.S. Provisional Patent Application Ser. No. 63/125,484 filed on Dec. 15, 2020, which is incorporated herein by reference.

TECHNICAL FIELD

The technical field is directed to coatings technology and more particularly to methods for measuring a color of a target coating and color measurement devices.

BACKGROUND

Automobiles, vehicles, and other items are typically coated with paint to provide protection from corrosion, and to provide an attractive appearance. However, different batches of a coating may have slightly different coloration. When an automobile coating is damaged, such as by an accident, it is desirable to re-paint the repaired parts of the automobile with paint that matches the original coating. The color of the original, target coating can be measured, but the presence of effect pigments such as interference effect pigments and reflective flakes can make matching the overall appearance of the target coating challenging. Interference effect pigments produce pearlescence. Coatings may be measured at several different angles for an approximate color match, but the different effects produced by reflective flakes and interference effect pigments within the target coating are difficult to match. No measurement devices are known that can accurately and consistently distinguish between the reflective flake and interference effect pigments.

Current measurement devices illuminate a target coating with light at one or more angles, and then measure the intensity of the reflected light at one or more angles. The light is shone on the target coating at an angle, such as 45°, so a specular line is defined as having an equal and opposite angle. Some devices measure the light at + and −15 degrees from the specular line, but these devices are understood to measure the light in a specular plane that includes the source of the light and the specular line. The devices that measure the light at + and −15 degrees from the specular line are measuring reflectance of flakes that have different angles relative to a line normal to the surface of the target coating, as explained in greater detail below. Therefore, these devices confound reflected light from reflective flakes and interference effects, making separation of the different effect difficult.

As such, it is desirable to provide a device and methods that can measure a color of a target coating and distinguish between reflective flakes and interference effect pigments. Furthermore, it is desirable to provide a device and methods for determining the amount of reflective flakes and interference effect pigments in a target coating, as well as the type of interference flakes, so an accurate appearance match can be provided. In addition, other desirable features and characteristics will become apparent from the subsequent summary and detailed description, and the appended claims, taken in conjunction with the accompanying drawings and this background.

SUMMARY

Devices and methods for measuring color of a target coating are provided. In an exemplary embodiment, a color measurement device includes a housing configured for placement on a target coating. A source is connected to the housing and directs a beam of electromagnetic radiation towards the target coating at an entrance angle. A spherical coordinate system is used, where a surface of the target coating is a reference plane, an origin is a point about where the beam impacts the surface of the target coating, and a zenith is a line normal to the target coating surface. The entrance angle is a polar angle measured from the zenith, and the beam is defined with an azimuth angle of 0. A first detector is connected to the housing and positioned to measure the electromagnetic radiation reflected by a target population of flakes within the target coating, where all the flakes in the target population of flakes have the same angled flake normal polar angle, where the first detector is positioned at a first polar angle. A second detector is connected to the housing and positioned to measure electromagnetic radiation reflected by the target population of flakes, where the second detector is positioned at a second polar angle different than the first polar angle.

A method of measuring color of a target coating is provided in another embodiment. The method includes illuminating the target coating with a beam of electromagnetic radiation at an entrance angle, where a spherical coordinate system is used. A surface of the target coating is a reference plane, an origin is a point about where the beam impacts the surface of the target coating, and a zenith is a line normal to the surface of the target coating. The entrance angle is a polar angle measured from the zenith, where the beam is defined with an azimuth angle of 0. The target coating includes flakes, where a target population of flakes is defined by all the flakes in the target population of flakes having the same angled flake normal polar angle, and where the target population of flakes have a plurality of flake normal azimuth angles. An intensity of the electromagnetic radiation reflected from the target population of flakes having a first flake normal azimuth angle is measured. The intensity of the electromagnetic radiation of the target population having a second flake normal azimuth angle is also measured, where the second flake normal azimuth angle is different than the first flake normal azimuth angle.

Another method of measuring color of a target coating is provided in yet another embodiment. The method includes illuminating the target coating with a beam of electromagnetic radiation at an entrance angle, where a spherical coordinate system is used. A surface of the target coating is a reference plane, an origin is about a point where the beam impacts the surface of the target coating, and a zenith is a line normal to the surface of the target coating. The entrance angle is a polar angle measured from the zenith, where the beam is defined with an azimuth angle of 0. The target coating comprises flakes, and a target population of flakes is defined by all the flakes in the target population of flakes having the same angled flake normal polar angle, where the beam illuminates the target population of flakes. An intensity of the electromagnetic radiation is measured with a detector positioned at a first polar angle measured from the zenith, where the first detector is positioned to receive electromagnetic radiation reflected from the beam by the target population of flakes. The intensity of electromagnetic radiation is also measured with a second detector positioned at a second polar angle measured from the zenith, where the second polar angle is different than the first polar angle. The second detector is also positioned to receive electromagnetic radiation reflected from the beam by the target population of flakes.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
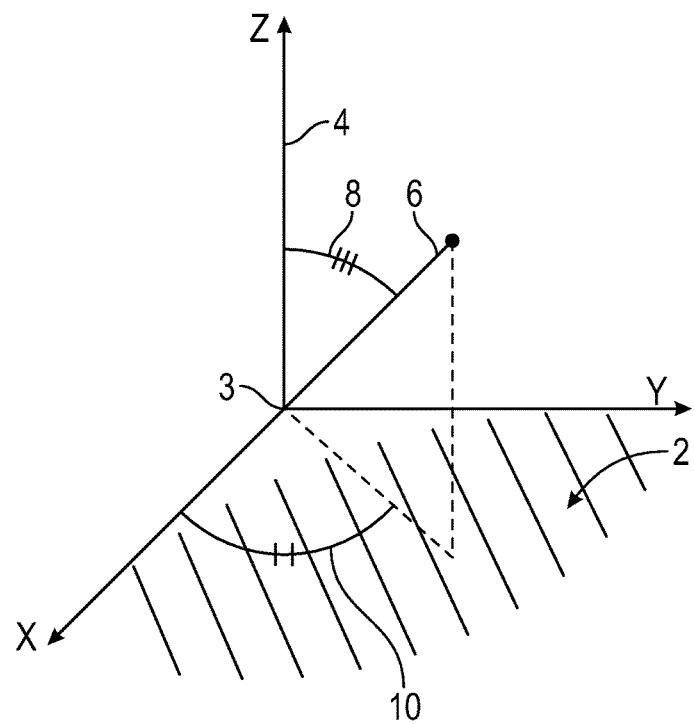
FIG. 1 is a diagram of a spherical coordinate system used as a reference for angle measurements.

The following detailed description is not intended to limit this description or the application and uses thereof. Furthermore, there is no intention to be bound by any theory presented in the preceding background or the following detailed description. It should be understood that throughout the drawings, corresponding reference numerals indicate like or corresponding parts and features.

The term "color data" or "color measurement data" of a coating can comprise measured color data including spectral reflectance values; X,Y,Z values; L*, a*, b* values where L* indicates lightness, a* indicates color from green (−) to red (+), and b* indicates color from blue (−) to yellow (+); L*,C*,h* values where L* indicates lightness, C* indicates chroma, and h* indicates hue; a flop index; or a combination thereof. Color data can further include a color code of a vehicle, a color name or description, or a combination thereof. Color data can even further include visual aspects of color of the coating, chroma, hue, lightness or darkness. The color data can be obtained by visual inspection, or by using a color measurement device such as a colorimeter, a spectrophotometer, or a goniospectrophotometer. In particular, spectrophotometers obtain color data by determining the amount of light reflected, transmitted, or otherwise produced over a range of wavelengths by a coating layer. The color data can also include descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by a color-appearance dual measuring device.

This description includes multiple references to angles using a spherical coordinate system. The protocol for describing these angles is explained with reference to FIG. 1. A "reference plane 2" is a plane defined by two axes, and used as a reference for other measurements. In FIG. 1, the reference plane 2 is defined by the X and Y axes. An "origin 3" is a point where the X, Y, and Z axes intersect, and a "zenith 4" is a line perpendicular to the reference plane 2 the extends from the origin 3. A point is positioned in space, and a theoretical "vector line 6" is drawn from the origin 3 to the point, where the vector line has a distance from the origin to the point. A "polar angle 8" is the angle measured from the zenith 4 to the vector line 6, and an "azimuth angle 10" is the angle of the orthogonal projection of the vector line 6 onto the reference plane 2, measured from a fixed reference on the reference plane 2, where that fixed reference in FIG. 1 is the X axis. Several points can have the same polar angle 8, and if the length of the vector line 6 was the same, these points would form a circle around the zenith 4.

Figure 2:
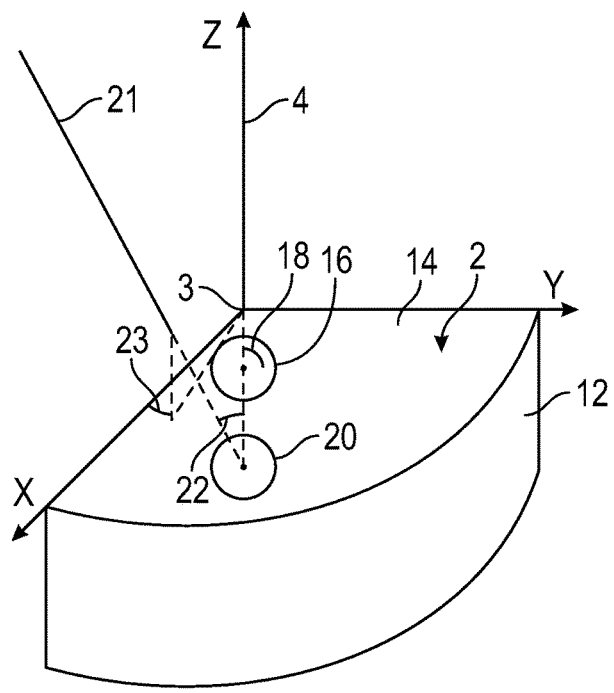
FIG. 2 is an illustration of an exemplary embodiment demonstrating flakes within a target coating.

Referring to FIG. 2, with continuing reference to FIG. 1, a target coating 12 has a surface 14 that is used as the reference plane 2 for a spherical coordinate system. Reflective flakes are positioned within the target coating 12 in a somewhat random distribution, where the flakes have a thin cross section and a much larger top and bottom surface area. The flakes have a flake normal line 21, where the flake normal line 21 is perpendicular to the larger top and bottom surface of the flake. In many embodiments, a large number of parallel flakes 16 are parallel with the surface 14 of the target coating 16, so the flake normal line for the parallel flakes 16 is the zenith 4. A polar angle of the flakes is measured from the flake normal line, so the parallel flakes 16 have a parallel flake normal polar angle 18 of 0°, measured from the zenith 4 to the parallel flake normal line, which is also the zenith 4. The target coating 12 also includes angled flakes 20, where the angled flakes 20 are not parallel with the surface 14 of the target coating 16. Therefore, the angled flakes 20 have an angled flake normal polar angle 22 that is greater than 0, measured from the zenith 4 to the flake normal line 21 for the angled flakes 20. In some embodiments, as the polar angle of the flake increases, the number of flakes with a constant polar angle (but different flake normal azimuth angles 23) decrease. The "flake normal azimuth angle 23" is the azimuth angle of the flake normal line 21, and this flake normal azimuth angle 23 is used to define the rotational position of a flake around a zenith line 4, or a line parallel to the zenith line 4. A target population of flakes can be defined with a constant polar angle 8, so all the flakes in a target population have the same polar angle 8, but have a wide variety of different flake normal azimuth angles 23.

Figure 3:
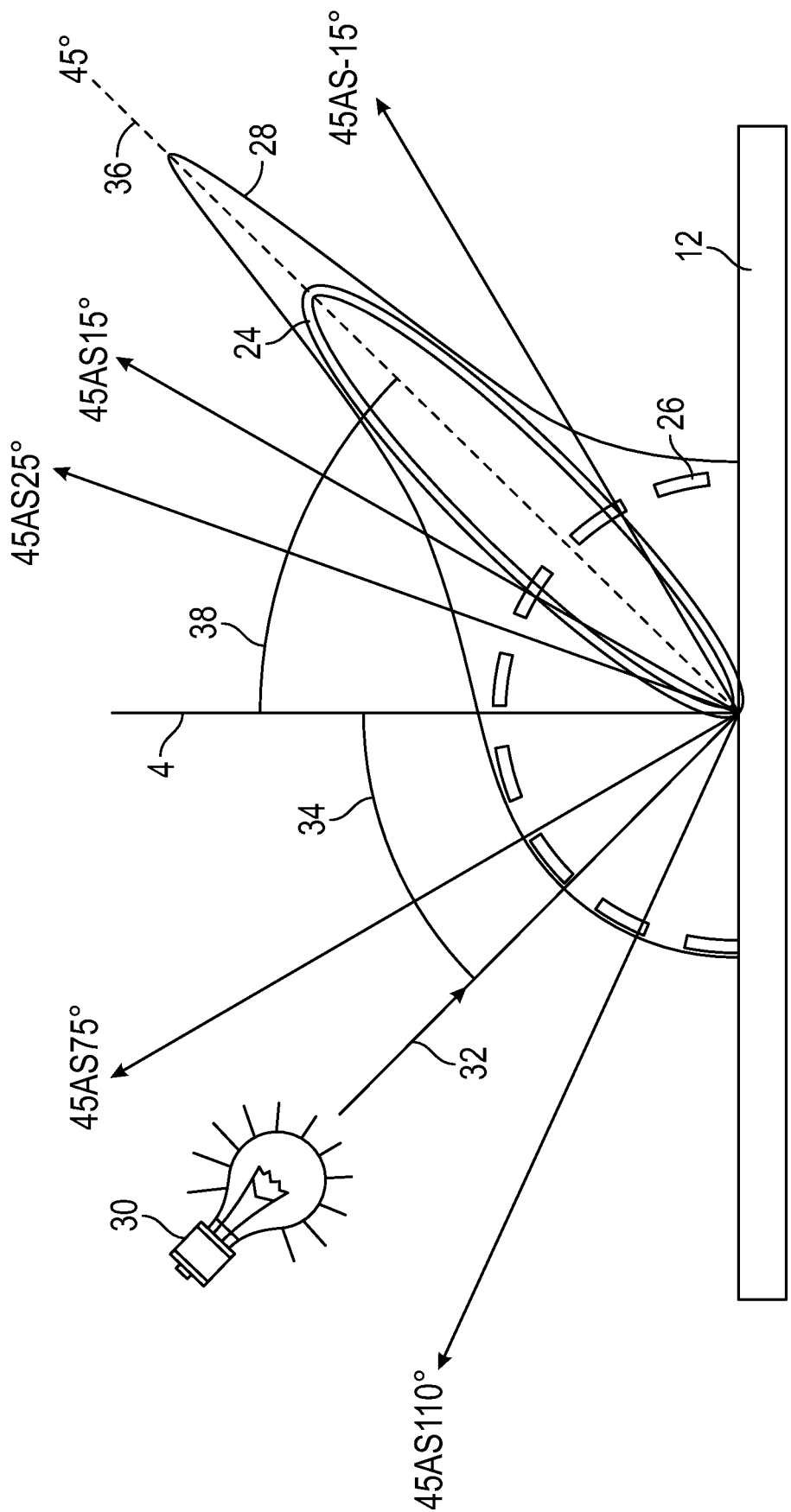
FIG. 3 is a side sectional diagram illustrating light intensity at various angles for a target coating illuminated with a beam.

Reference is made to FIG. 3, with continuing reference to FIGS. 1 and 2. Historical color measurement devices have used a beam of light or electromagnetic radiation combined with a plurality of detectors set at selected angles, where the detectors detect intensity of electromagnetic radiation within a range of wavelengths. In the example of a historical color measurement device illustrated in FIG. 3, a source 30 is positioned to emit a beam 32 at an entrance angle 34 of 45 degrees (45°), where the entrance angle 34 is the polar angle of the beam 32. The source 30 and beam 32 are defined as having an azimuth angle 10 of zero. A specular line 36 is the line produced when the beam 32 reflects off of the surface 14 of the target coating 12, so in the illustrated embodiment the specular line 36 has a specular angle 38 of 45°, and an azimuth angle of 180°. The specular angle 38 is the polar angle of the specular line 36.

The beam 32 impacts the target coating 12, and light is reflected off of the flakes within the target coating 12, where the light reflects at an angle equal and opposite to the incidence angle of the light onto the surface of the flake. The target coating 12 includes a plurality of flakes at a variety of flake angles. The intensity of the reflected light is illustrated as a directional term 24, where the directional term 24 shows the intensity of light measured at each angle from the origin 3. A vector (not illustrated) beginning at the origin 3 and extending to a point on the directional term 24 illustrates the intensity of the reflected light at the polar angle 8 and azimuth angle 10 of that vector. The length of the vector, or the distance from origin 3, represents the intensity of the light, where longer distances represent more intensity. The directional term 24 is an oval in FIG. 3. Diffuse light is also produced from the target coating 12, and the intensity of the diffuse light is referred to as a diffuse term 26. Diffuse light is emitted at about the same intensity in all directions, so the diffuse term 26 appears as a dashed semicircle about a midpoint at the origin 3. A total intensity term 28 is a sum of the direction term 24 and the diffuse term 26.

In historical color measurement devices, detectors have been positioned at several locations, where the position of the detectors is noted with reference to the specular line 36. For example, the term "45AS15°," as shown in FIG. 3, refers to a position that is 15° (the term 15°) from the specular line 36 (referring to the term "AS," for as specular), where the beam 32 impacts the target coating 12 at an entrance angle of 45 (the term "45"). A detector position on the vector label "45AS110" would measure diffuse light from the diffuse term 26, but essentially no reflected light from the direction term 24. Detectors positioned on the vectors labeled "45AS−15°" and "45AS15°" would measure some diffuse light from the diffuse term 26, as well as some reflected light from the direction term 24. A detector positioned on the vector labeled "45AS25°" would measure diffuse light from the diffuse term 26, but less direction light from the directional term 24 than detectors positioned at the "45AS15°" position or the "45AS−15°" position. Historical color measurement devices typically include detectors positioned at the "45AS−15°" position, the "45AS15°" position, and one or more other positions that are more than 15° from the specular line 36. Historical color measurement devices have positioned detectors at the same angle above and below the specular line 36, and detectors positioned at different angles above and below the specular line 36 is described below.

Figure 4:
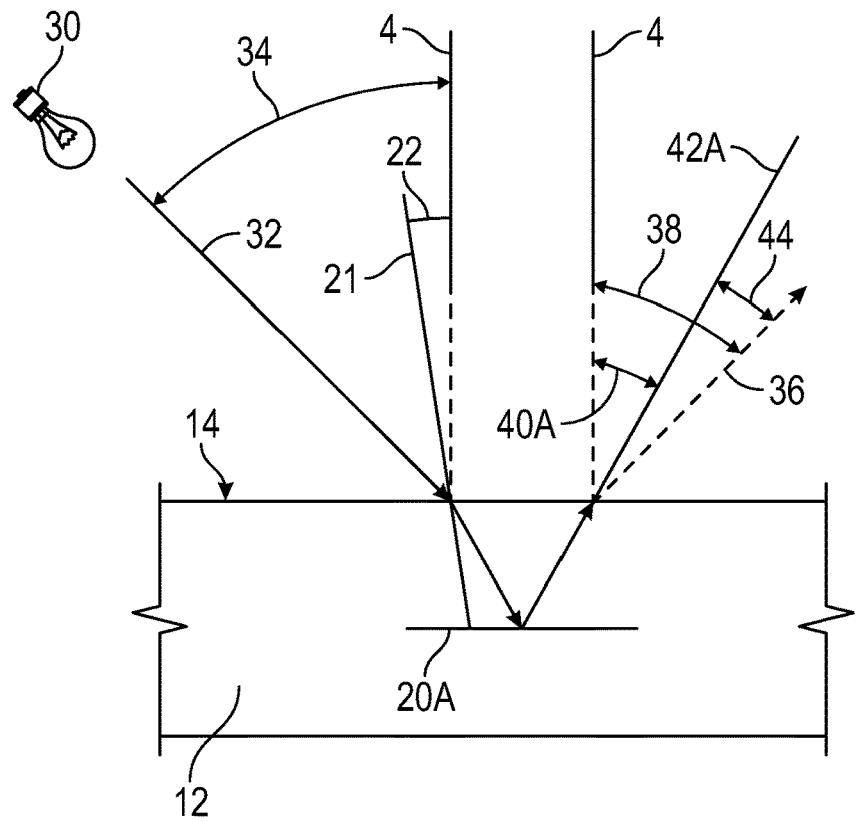
FIGS. 4 and 5 are side sectional diagrams depicting different embodiments of a beam of electromagnetic radiation propagating around and through a target coating.
Figure 5:
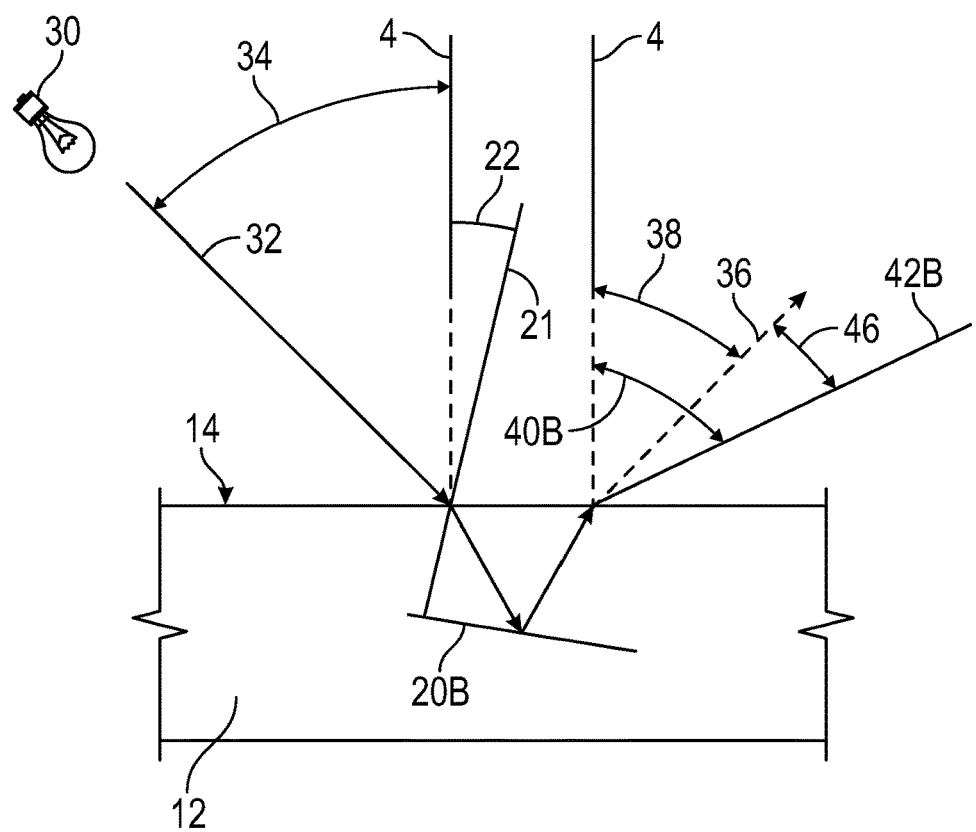

Reference is made to FIGS. 4 and 5, with continuing reference to FIGS. 1-3. The angled flakes 20 reflect light equal and opposite to the surface of the angled flake 20, but this light is not reflected equal and opposite to the surface 14 of the target coating because the angled flake 20 is not parallel with the surface 14 of the target coating. The angled flakes 20 of a target population with a constant polar angle will have a plurality of different flake normal azimuth angles 23. In this description, for the sake of simplicity, FIGS. 4 and 5 show the angled flakes 20 with flake normal azimuth angles 23 of 180° and 0°, with the understanding that other angled flakes 20 having the same polar angle are present, but are not illustrated. FIGS. 4 and 5 show angled flakes 20 as a line, where the FIGS. are oriented to show the X-Z plane in a 2-dimensional format. The large top and bottom surfaces of the angled flakes 20 with azimuth angles of 0° or 180° are aligned with the view in FIGS. 4 and 5, so they do appear as a simple line.

FIG. 4 illustrates a first angled flake 20A, and FIG. 5 illustrates a second angled flake 20B, where the first and second angled flakes 20A and 20B have the same angled flake normal polar angle 22, but have flake normal azimuth angles 23 of 0 and 180 degrees, respectively. The first angle flake 20A has a first flake normal azimuth angle (not individually illustrated, because the first flake normal azimuth angle is 0 degrees and is not visible in FIG. 4) of the plurality of flake normal azimuth angles 23 of the target population of flakes. The second angled flake 20B has a second flake normal azimuth angle (not individually illustrated, because the second flake normal azimuth angle is 180 degrees and is not visible in FIG. 5) of the plurality of flake normal azimuth angles 23 of the target population of flakes. As described above, the illustrated first and second flake normal azimuth angles are 180° and 0°, but the first and second flake normal azimuth angles may be other angles in other embodiments, as long as they are not the same as each other.

A source 30 directs a beam 32 of electromagnetic radiation towards the target coating 12, where the beam 32 is at an entrance angle 34. The origin 3 is located at about the point where the beam 32 impacts the surface 14 of the target coating 12, but the theoretical origin 3 may be moved to account for travel of the beam 32 within the target coating 12. As such, the origin 3 is positioned at a point where a polar angle is measured from the surface 14, and the difference in position between the point where the beam 32 enters and leaves the target coating 12 is small so the origin 3 is in about the same place even though illustrated at two different locations in FIG. 4 and in FIG. 5. The entrance angle 34 is the polar angle of the beam 32, measured from the zenith 4. FIGS. 4 and 5 illustrate a specular plane, where the specular plane is a plane that includes the zenith 4, the source 30, and the beam 32 before the beam 32 reaches the target coating 12, so the specular plane is perpendicular to the reference plane 2. An azimuth angle 10 of 0° is defined as the azimuth angle 10 of the source 30, with other azimuth angles 10 measured from this reference point. The beam 32 emanates from the source 30 and propagates to the origin 3, so the beam 32 is also defined with an azimuth angle of 0°. FIGS. 4 and 5 include two different zenith 4 lines, both of which are perpendicular to the surface 14 of the target coating 12, and where each is used to illustrate polar angles of different aspects.

The beam 32 is electromagnetic radiation and may have wavelengths in the visible spectrum (i.e., light), and/or other wavelengths. The beam 32 illuminates the target coating 12 and also the flakes within the target coating 12. The specular line 36 is the line that represents reflection of the beam 32 off of the surface 14 of the target coating 12, as mentioned above. The specular line 36 also represents the reflection of the beam 32 off of a parallel flake 16, so a specular angle 38 is the same as the entrance angle 34 (because light reflects at an equal and opposite angle to the incident light), but the specular angle 38 has an azimuth angle of 180°. In short, the entrance angle 34 and the specular angle 38 are the same, but extend in opposite directions from the zenith 4.

The beam 32 refracts (i.e., bends) as it enters and exits the target coating 12. This refraction changes the angle at which the incoming beam 32 contacts the angled flakes 20. When the beam 32 reaches the angled flakes 20, it reflects off of the surface of the angled flakes 20 at an angle equal and opposite to the incidence angle of the beam 32 onto the angled flake 20. In the exemplary embodiment illustrated in FIGS. 4 and 5, the entrance angle 34 is 45°, the specular angle is 45°, and the angled flake normal polar angle 22 is about 4.2°, where the angled flake normal polar angle 22 is measured from the flake normal line 21 to the zenith 4, as described above. Of course, these components may have other angles in alternate embodiments. The beam 32 refracts (bends) when it enters the target coating 12, reflects off of the angled flake 20, then refracts again as it exits the target coating 12, so the beam 32 exits the target coating in an exit line at an exit angle 40. (NOTE: In FIG. 4, the exit line is a first exit line referenced with the number 42A, and the exit angle is a first exit angle referenced with the number 40A. In FIG. 5, the exit line is a second exit line referenced with the number 42A, and the exit angle is a second exit angle referenced with the number 40B.) A "target population" of flakes is defined herein as a group of angled flakes 20 that all have about the same angled flake normal polar angle 22, but have a variety of different flake normal azimuth angles 23. In an exemplary embodiment, a single angled flake normal polar angle 22 is defined as being a value +/−0.5° from a named value. Therefore, in this illustrated example, the angled flake normal polar angle 22 is 3.7 to 4.7°, or 4.2°+/−0.5°. In alternate embodiments, a single angled flake normal polar angle 22 is +/−0.3°, or +/−0.1°.

Figure 6:
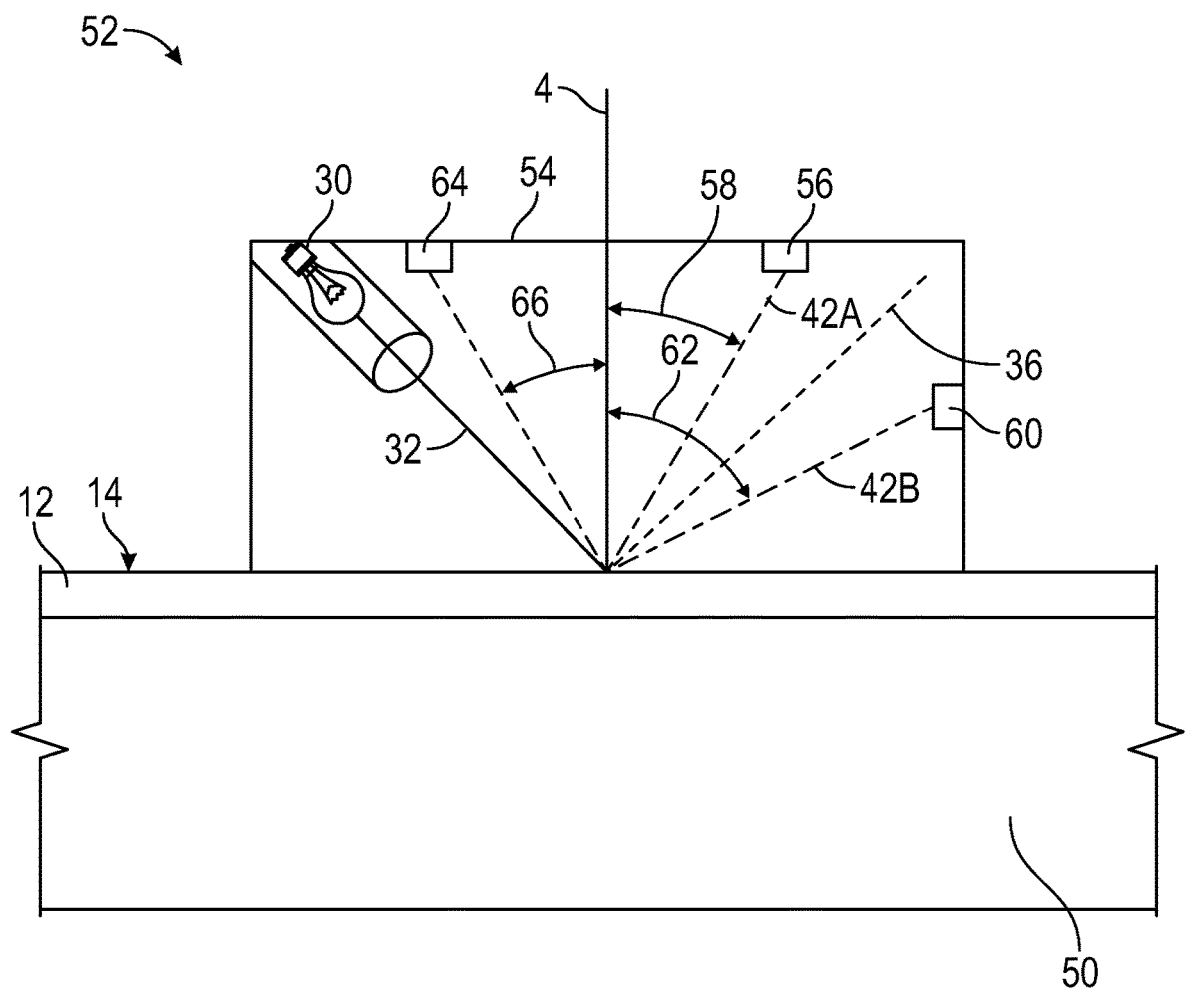
FIG. 6 is side sectional diagram depicting an exemplary embodiment of a color measurement device positioned on a target coating.
Figure 7:
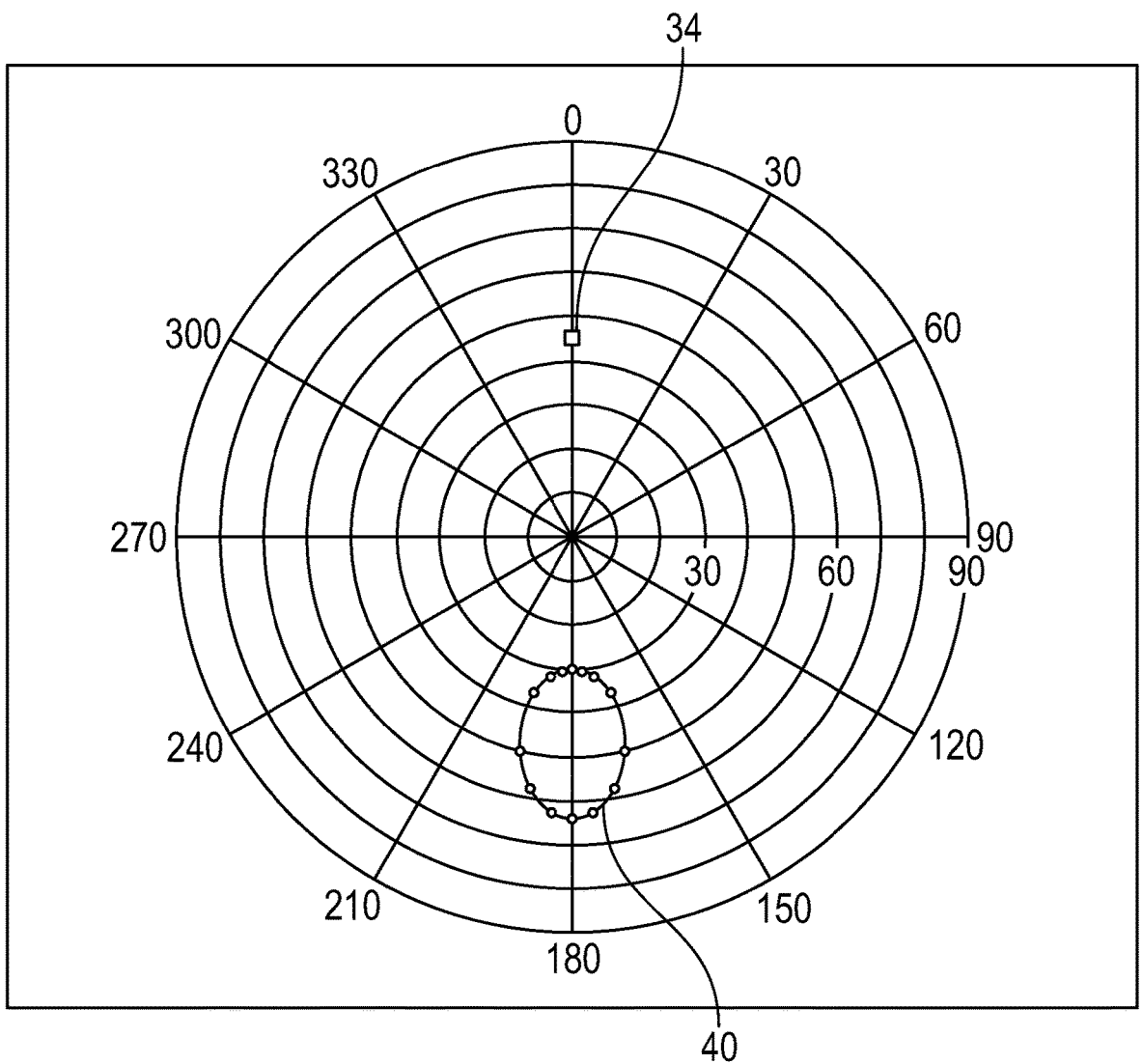
FIG. 7 is a plot illustrating an embodiment of the polar angles and flake normal azimuth angles of a beam of light reflecting off of a target population of angled flakes, where the target population of angled flakes is defined by a constant angled flake normal polar angle.

The beam 32, which may be referred to herein as the "light," reflects off the target population, and exits the target coating 12 at different exit angles 40A, 40B and/or azimuth angles for the different flake normal azimuth angles of the target population. FIG. 6 illustrates the exit angles 40 (i.e., the polar angles) and associated flake normal azimuth angles 23 for a flake population with an angled flake normal polar angle 22 of 4.2, and a beam 32 entrance angle 34 of 45° (a polar angle) at an azimuth angle of 0°. In FIG. 7, the polar angle is shown on the horizontal axis, where the concentric circles represent a given polar angle, and the flake normal azimuth angle is shown around the perimeter of the chart, where the radiating lines represent a given azimuth angle. As shown, the beam has a polar entrance angle 34 of 45° (follow the concentric circles to the horizontal axis), and an azimuth angle of 0° (follow the radiating, vertical line to the "0" at the top of the chart). As can be seen, the minimum exit angle 40 (a polar angle) is 30° for the illustrated embodiment, referred to herein as the first exit angle 40A, and the maximum exit angle 40 is about 64° for the illustrated embodiment, referred to herein as the second exit angle 40B.

Referring back to FIGS. 4 and 5, with continuing reference to FIGS. 1, 2, 6, and 7, the first exit angle 40A of 30° is illustrated in FIG. 4, and the second exit angle 40B of about 64° is illustrated in FIG. 5. The first and second exit angles 40A, 40B result from the first and second angled flakes 20A, 20B, respectively, of the target population having flake normal azimuth angles of 180° and 0°. In the illustrated example, the specular angle 38 is 45°. It is interesting to note that an angle defined between the first and second exit lines 42A, 42B and the specular line 36 has a different value for FIGS. 4 and 5. In FIG. 4, the first exit angle 40A is 30° and produces a first exit line 42A that extends from about the origin 3, and the specular angle is 45°, so the angle formed by the first exit line 42A and the specular line 36 is 15° (i.e., 45°−30°=15°). This angle may be referred to as the positive aspecular exit angle 44. However, in FIG. 5, the second exit angle 40B is about 64° and produces a second exit line 42B that extends from about the origin 3, and the specular angle remains at 45°, so the angle formed by the second exit line 42B and the specular line 36 is about 19° (i.e., 64°−45°=19°). This angle may be referred to as the negative aspecular exit angle 46. As such, the first and second exit lines 42A, 42B from a target population of angled flakes 20 have different positive and negative aspecular exit angles 44, 46. In an exemplary embodiment, the negative aspecular exit angle 46 is greater than the positive aspecular exit angle 44.

Figure 8:
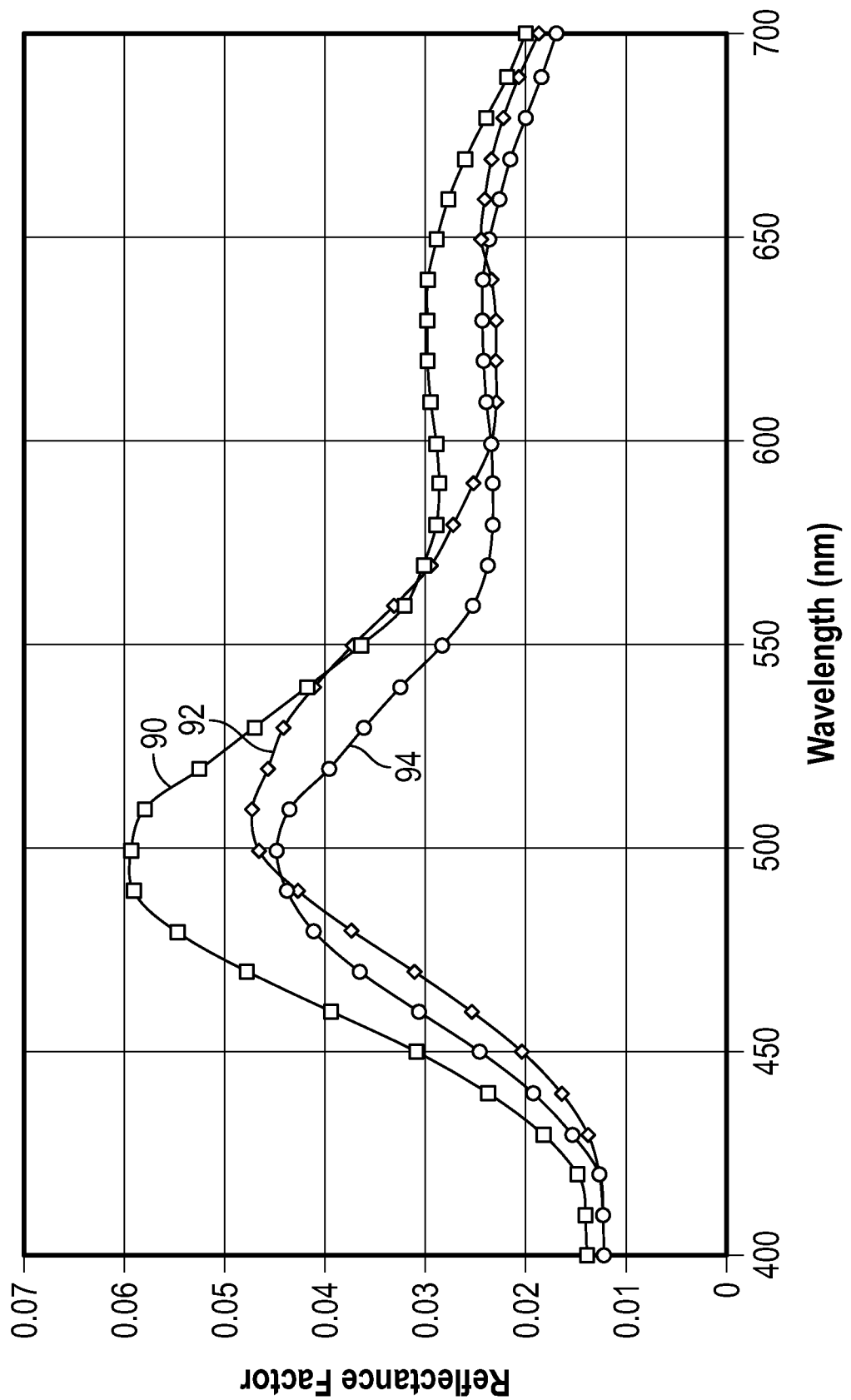
FIG. 8 is a plot of the light intensity as a function of wavelength for a target coating measured at 3 different exit angles, where the target coating is illuminated at an entrance angle of 45°.

Reference is made to FIG. 8, with reference to FIG. 1-3. FIG. 8 is an illustration of the intensity of light measured at different angles, where the entrance angle is 45°. The wavelength of the light is shown on the X axis, and the intensity of the light from the sum of the diffuse term 26 and the directional term 24 is shown on the Y axis. The graph in FIG. 8 shows 3 lines; the 45AS−15 line 90, the 45AS+15 line 92, and the 45AS−19 94 line 94. The 45AS+15 line 92 and the 45AS−19 line 94 show the intensity of reflected light off of effect pigment flakes that have the same polar angle 8. In other words, the 45AS+15 line 92 and the 45AS−19 line 94 show the intensity of reflected light off of a target population of flakes. The 45AS−15 line 90 shows a higher intensity of light that the other two illustrated lines, because the 45AS−15 line 90 measures the intensity of light reflected from flakes have a different, and smaller, angled flake normal polar angle 22. The 45AS+15 line 90 is measured using the protocol described for FIG. 3, so for the exemplary embodiment with an entrance angle 34 of 45°, the 45AS+15 line 92 corresponds to a polar angle 8 of 30°. In a similar manner, for the same embodiment, the 45AS−15 line 90 corresponds to a polar angle 8 of 60°, and the 45AS−19 line 92 corresponds to a polar angle 8 of 64°. The shift between the 45AS+15 line 92 and the 45AS−19 line 94 is explained below.

The exemplary embodiments described above utilize a target coating 12 with a refractive index of about 1.5. However, the same type of results are seen for different refractive indexes, where the measured angles may be different than as described above. As such, for target coatings 12 with different refractive indexes, and a target population of angled flakes 20 having a constant angled flake normal polar angle 22, the maximum and minimum exit angles 40 (as illustrated in FIG. 7) would have different values than as mentioned above, but the positive and negative aspecular exit angles 44, 46 would still be different, and the general shape of the exit angles 40 in the chart in FIG. 7 would be the same. The exemplary embodiment described is for reference, and is not intended to be limiting.

Reference is now made to FIG. 6, with continuing reference to FIGS. 1-5 and 7. The target coating 12 overlies a substrate 50 in an optional embodiment, but the target coating 12 may be removed from the substrate 50 in alternate embodiments. In an exemplary embodiment, a color measurement device 52 for measuring the color of a target coating 12 includes a housing 54 configured for placement overlying the target coating 12, a source 30 for producing the beam 32, and a plurality of detectors configured for detecting the intensity of electromagnetic radiation. The term "overlying," as used herein, means directly on and touching, or over such that an intervening component or a space may be between the overlying component and the underlying component. The source 30 and each of the plurality of detectors are connected to the housing 54. The source 30 is connected to the housing 54 so that the beam 32 is directed towards the target coating 12 at the entrance angle 34. The term "connected," as used herein, means directly or indirectly connected, such that the source 30 may be mounted in the housing 54, or the source 3 may be indirectly affixed in a position in the housing 54, such as held in place with a bracket, wires, or other types of connectors. The positions of the source 30 and the detectors define the angled flake normal polar angle 22 of the target population of flakes being measured, so different populations of flakes may be measured by moving the source 30 and/or the detectors. Each different population of flakes has a constant angled flake normal polar angle 22, but the angled flake normal polar angle 22 is different for each different population of flakes.

A first detector 56 is connected to the housing 54 and positioned to measure the intensity of electromagnetic radiation reflected from the target population at a first polar angle 58. A second detector 60 is connected to the housing 54 and positioned to measure the intensity of electromagnetic radiation reflected from the target population at a second polar angle 62, where the first and second polar angles 58, 62 are different from each other. In an exemplary embodiment, the first polar angle 58 is the same as the first exit angle 40A, so the first detector 56 may be positioned along the first exit line 42A. The second polar angle 62 is the same as the second exit angle 40B in an exemplary embodiment, so the second detector 60 may be positioned along the second exit line 42B. The first exit line 42A may be defined between the first detector 56 and the origin 3, and the second exit line 42B may be defined between the second detector 60 and the origin 3. However, in alternate embodiments, either the first and/or second polar angles 58, 62 may be different than the first and/or second exit angles 40A, 40B, where the first and/or second detectors 56, 60 may be connected to the housing 54 in the specular plane, or outside of the specular plane at an azimuth angle other than 180°. The first and second detectors 58, 62 are positioned to measure reflectance from the target population of angled flakes 20, so the first and second detectors 58, 62 are positioned at points indicated on the oval chart in FIG. 7.

Interference flakes act as a filter, and change color as a function of the angle of incidence of incoming light. Referring to FIGS. 4 and 5, the incidence angle for the first angled flake 20A is smaller than the incidence angle for the second angled flake 20B. As such, the color of the reflected light is different for the first exit line 42A and the second exit line 42B, assuming the angled flakes 20 are interference flakes. The quantity of angled flakes 20 in the target coating 10 can be determined, at least in part, by evaluating the intensity measured by the first detector 56 and the intensity measured by the second detector 60. Furthermore, the amount of interference effect from the target coating 12, and therefore the amount of interference effect pigment (if any) in the target coating 12, can be determined by comparing the intensities measured by the first and second detectors 58, 62, respectively.

Referring again to FIG. 6, with continuing reference to FIGS. 1-5 and 7, the color measurement device 52 may also include an optional third detector 64, and may include additional detectors in various embodiments. The third detector 64 is positioned at a third polar angle 66. The third polar angles 66 is different than either of the first or second polar angles 58, 62. The optional third detectors 64 may be used for measuring color data of the target coating 12, such as L*, a*, b* data or other color data, as known to those skilled in the art.

The azimuth angles 10 for the first and/or second detector 56, 60 may be the same, such as an azimuth angle of 180 degrees in an exemplary embodiment, but the first and second flake normal azimuth angles 23 are different from each other even though the azimuth angles 10 for the first and second detectors 56, 60 may be the same. In the embodiment illustrated in FIGS. 4, 5, and 6, the first flake normal azimuth angle is 0 degrees, and reflection from the first angled flake 20A is measured by the first detector 56 at an azimuth angle 10 of 180 degrees. The second flake normal azimuth angle is 180 degrees (as opposed to 0 degrees for the first angled flake 20A), and reflection from the second angled flake 20B is measured by the second detector 60 at an azimuth angle 10 of 180 degrees, which is the same as the azimuth angle 10 for the first detector 56.

Due to the principle of optical reciprocity, the source 30 and the detectors may be interchanged, and the results will be the same. In an exemplary embodiment, a color measurement device 52 may include a plurality of sources 30 with a single detector, all positioned opposite to the illustration in FIG. 6. However, the plurality of sources 30 may be activated at different times, so the single detector only detects the intensity of light from one source 30 at a time. The interchangeability of the source(s) 30 and detector(s) applies to the various embodiments described herein.

The interference effect may be detected when reflection from a single target population of flakes is measured at two (or more) different flake normal azimuth angles 23 of the target population of flakes. In the description above, the first and second detectors 56, 60 may measure the intensity of electromagnetic radiation at the same time, which is the time during which the source 30 is activated and the beam 32 is projected towards the target coating 12. In an alternate embodiment, it is possible to measure reflectance of the target population of flakes at the first flake normal azimuth angle at a first time, and then move the source 30 to change the entrance angle 34. Reflection from the target population of flakes at the second flake normal azimuth angle could then be performed at a second time later than the first time. It is even possible for the same detector to be used for measuring the intensity of reflected electromagnetic radiation at the first and second times, possibly without moving the detector, and still measuring reflectance from the target population at different first and second flake normal azimuth angles. Therefore, in some embodiments, the intensity of electromagnetic radiation reflected from the target population at different flake normal azimuth angles 23 of the target population of flakes is measured at the same time, and in other embodiments it is measured at different times.

Figure 9:
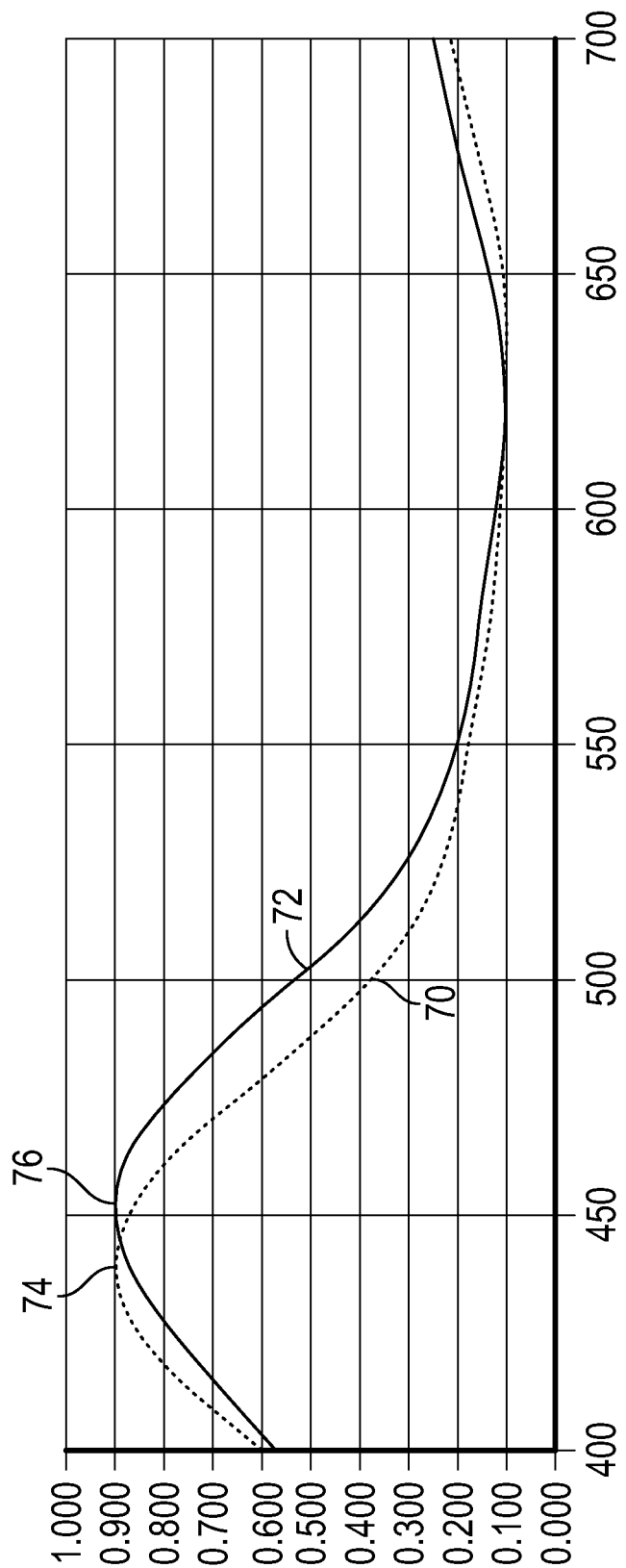
FIG. 9 is an exemplary plot of the intensity of electromagnetic radiation measured by two different detectors, where the intensity is plotted against the wavelength of the electromagnetic radiation.

Referring to FIG. 9, with continuing reference to FIGS. 1-8, the intensity of the electromagnetic radiation measured by the first and second detectors 56, 60 is shown in graphical form as a first plot 70 and a second plot 72, with intensity represented on the "Y" axis and wavelength of the electromagnetic radiation shown on the "X" axis. As can be seen, the first and second plots 70, 72 are similar, but one is shifted, or offset, from the other. This is similar to the shift seen in FIG. 8, described above. This shift results from an interference effect pigment in the target coating 12. As mentioned above, the interference flakes act as a filter, and change color as a function of the angle of incidence of incoming light. The first and second detectors 56, 60 are positioned at different polar angles, so they measure reflectance from the target population of flakes having different incidence angles from the beam 32, and therefore measure different colors if the target population includes interference flakes.

The amount of interference effect pigment, and the type of interference effect pigment, can be estimated by determining the magnitude of the shift of the first and second plots 70, 72, and the peak intensity of the first and second plots 70, 72, respectively. The magnitude of the shift may be determined in a variety of manners, and computers, software, and other electronic data manipulation may be utilized. In an exemplary embodiment, the first plot 70 is mathematically shifted by a unit towards the second plot 72, (or vice versa, where the second plot 72 is shifted towards the first plot 70), and the result is evaluated to determine if the shift results in alignment. In an exemplary embodiment, the first plot 70 is shifted by a wavelength of one nanometer, where one nanometer is the "unit" mentioned above, but other units or shift increments may be used in alternate embodiments. After the first plot 70 is shifted by a unit, the process of shifting the first plot 70 is repeated until the first and second plots 70, 72 are aligned. When the first plot 70 is shifted too far, increased misalignment is found relative to the previous shift. As such, the best alignment can be found by incrementally shifting one plot towards the other until the alignment begins to deteriorate. Measurement of the shift is one exemplary method of comparing the intensity of electromagnetic radiation measured by the first and second detectors 52, 54.

The first plot peak 74 is evaluated to determine the wavelength of electromagnetic radiation in an exemplary embodiment, where the wavelength of electromagnetic radiation corresponds to a color of the interference effect pigment. In an alternate embodiment, the second plot peak 76 is evaluated to determine the color. If the target coating 10 included no interference effect pigments, but the target coating 10 did include reflective flakes, the first and second plots 70, 72 would align at the time of measurement and there would not be any shift between the two. Therefore, measuring the intensity of electromagnetic radiation reflected from the target population of angled flakes 20 at two different angles allows the color measurement device 52 to differentiate reflective flakes from interference effect pigments in the target coating 12.

Figure 10:
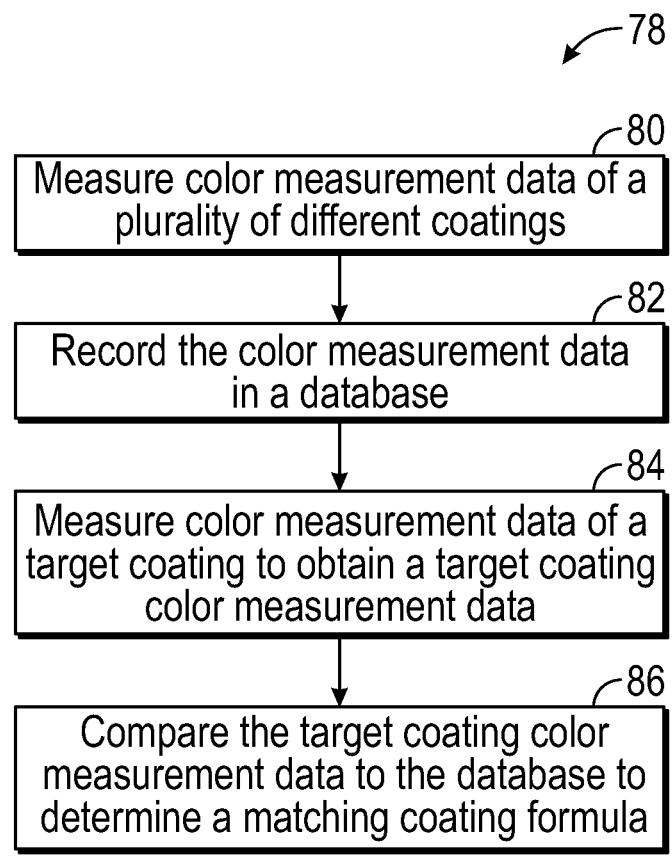
FIG. 10 is a flowchart of a method for determining a matching coating formula for a target coating.

The color measurement device 52 described above can be used to determine a matching coating formula for the target coating 12. A method 78 of determining the matching coating formula is illustrated in FIG. 10. Step 80 includes measuring the color measurement data of a plurality of different coatings, where the coating formula for the plurality of different coatings are known. The color measurement data is measured with the color measurement device 52 described above. In step 82, the color measurement data of the plurality of different coating colors is recorded in a database. Step 84 includes measuring the color measurement data of a target coating 12 to obtain a target coating color measurement data, as described above. In step 86, the target coating color measurement data is compared to the color measurement data in the database to locate matching recorded color measurement data. The matched color measurement data corresponds to a known matching coating formula that can be utilized to match the appearance of the target coating 12. This method allows the user to accurately find a matching coating formula for a target coating 12 that includes reflective flakes and/or interference effect pigments, which can aid in matching the coating of a damaged vehicle or in matching coatings for Original Equipment Manufacturers.

While at least one embodiment has been presented in the foregoing detailed description, it should be appreciated that a vast number of variations exist. It should also be appreciated that the embodiment or embodiments are only examples, and are not intended to limit the scope, applicability, or configuration in any way. Rather, the foregoing detailed description will provide those skilled in the art with a convenient road map for implementing an embodiment, it being understood that various changes may be made in the function and arrangement of elements described in an embodiment without departing from the scope as set forth in the appended claims and their legal equivalents.

What is claimed is:

1. A color measurement device comprising:
    a housing, wherein the housing is configured for placement on a target coating comprising flakes;
    a source that produces electromagnetic radiation connected to the housing, wherein the source is positioned to direct a beam of the electromagnetic radiation towards the target coating at an entrance angle, where a spherical coordinate system is used, where a surface of the target coating is a reference plane of the spherical coordinate system, an origin of the spherical coordinate system is a point about where the beam impacts the surface of the target coating, a zenith of the spherical coordinate system is a line normal to the surface of the target coating, wherein the entrance angle is a polar angle measured from the zenith, and wherein the beam is defined with an azimuth angle of 0;
    a first detector connected to the housing and positioned to measure the electromagnetic radiation reflected by a target population of flakes within the target coating, wherein all the flakes in the target population of flakes have the same angled flake normal polar angle, wherein the first detector is positioned at a first polar angle;
    a second detector connected to the housing and positioned to measure the electromagnetic radiation reflected by the target population of flakes, wherein the entrance angle for the source is the same for the position of the first detector and for the position of the second detector, wherein the second detector is positioned at a second polar angle, and wherein the second polar angle is different than the first polar angle; and
    wherein a specular line extends from the surface of the target coating at a specular angle, wherein the specular angle is the polar angle equal to the entrance angle, wherein the specular line has the azimuth angle of 180°, wherein a positive aspecular exit angle is defined between the specular line and a first exit line, wherein the first exit line extends from the first detector to the origin, and wherein a negative aspecular exit angle is defined between the specular line and a second exit line extending from the origin to the second detector, and wherein;
    the negative aspecular exit angle is greater than the positive aspecular exit angle.

2. The color measurement device of claim 1, wherein:
    the first detector is positioned to measure the electromagnetic radiation reflected by the target population of flakes having a first flake normal azimuth angle; and
    the second detector is positioned to measure the electromagnetic radiation reflected by the target population of flakes having a second flake normal azimuth angle different than the first flake normal azimuth angle.

3. The color measurement device of claim 1, wherein a specular plane is defined as a plane that includes the source and the zenith, and wherein:
    the first detector is positioned in the specular plane.

4. The color measurement device of claim 3, wherein the second detector is positioned in the specular plane.

5. The color measurement device of claim 1, further comprising:
    a third detector positioned at a third polar angle, where the third polar angle is different than the first polar angle and the second polar angle.

6. The color measurement device of claim 1, wherein the source produces visible light.

7. A method of measuring color of a target coating comprising:

illuminating the target coating with a beam of electromagnetic radiation at an entrance angle, where a spherical coordinate system is used, where a surface of the target coating is a reference plane of the spherical coordinate system, an origin of the spherical coordinate system is a point about where the beam impacts the surface of the target coating, a zenith of the spherical coordinate system is a line normal to the surface of the target coating, wherein the entrance angle is a polar angle measured from the zenith, wherein the beam is defined with an azimuth angle of 0, wherein the target coating comprises flakes, wherein a target population of flakes is defined by all the flakes in the target population of flakes having the same angled flake normal polar angle, and wherein the target population of flakes have a plurality of flake normal azimuth angles;

measuring an intensity of the electromagnetic radiation reflected from the target population of flakes having a first flake normal azimuth angle of the plurality of flake normal azimuth angles;

measuring the intensity of the electromagnetic radiation reflected from the target population of flakes having a second flake normal azimuth angle of the plurality of flake normal azimuth angles, wherein the entrance angle for the source is the same for measuring the intensity of electromagnetic radiation reflected from the target population of flakes having a first flake normal azimuth angle and for measuring the intensity of the electromagnetic radiation reflected from the target population of flakes having a second flake normal azimuth angle, where the second flake normal azimuth angle is different than the first flake normal azimuth angle; and wherein a specular line extends from the surface of the target coating at a specular angle, wherein the specular angle is the polar angle equal to the entrance angle, wherein the specular line has the azimuth angle of 180°, wherein a positive aspecular exit angle is defined between the specular line and a first exit line, wherein the first exit line extends from a first detector to the origin, wherein the first detector measures the intensity of the elctromagentic radiation reflected from the target populat of flakes having the first flake normal azimuth angle, wherein a negative aspecular exit angle is defined between the specular line and a second exit line extending from the origin to a second detector, wherein the second detector measures the intensity of the elctromagentic radiation reflected from the target populat of flakes having the second flake normal azimuth angle, and wherein;

the negative aspecular exit angle is greater than the positive aspecular exit angle.

8. The method of claim 7, wherein:

measuring the electromagnetic radiation reflected from the target population of flakes having the first flake normal azimuth angle and measuring the electromagnetic radiation reflected from the target population of flakes having the second flake normal azimuth angle happens at the same time and from the same source.

9. The method of claim 7, further comprising:

plotting a first intensity against a wavelength of the electromagnetic radiation to form a first plot, where the first intensity is the intensity of electromagnetic radiation reflected from the target population of flakes having the first flake normal azimuth angle;

plotting a second intensity against the wavelength of the electromagnetic radiation to form a second plot, wherein the second intensity is the intensity of electromagnetic radiation reflected from the target population of flakes having the second flake normal azimuth angle; and determining a shift of the first plot relative to the second plot.

10. The method of claim 9, wherein determining the shift of the first plot relative to the second plot comprises determining a magnitude of the shift.

11. The method of claim 10, further comprising:

determining an amount of interference effect pigment in the target coating utilizing the magnitude of the shift.

12. The method of claim 9 further comprising:

determining a first plot peak; and determining a color of an interference effect pigment in the target coating from the first plot peak.

13. The method of claim 7, wherein:

measuring the intensity of the electromagnetic radiation reflected from the target population of flakes having the first flake normal azimuth angle, and measuring the intensity of the electromagnetic radiation reflected from the target population of flakes having the second flake normal azimuth angle comprises obtaining a target coating color measurement, the method further comprising;

selecting a coating formula that about matches the target coating color measurement from a database.

14. The method of claim 7, wherein:

the angled flake normal polar angle varies by 0.5 degrees or less.

15. The method of claim 7, wherein:

a specular plane is defined as a plane that includes the zenith and the beam before the beam reaches the target coating, and wherein:

measuring the intensity of the electromagnetic radiation reflected from the target population of flakes having the first flake normal azimuth angle comprises measuring the intensity of the electromagnetic radiation reflected from the target population of flakes having the first flake normal azimuth angle in the specular plane.

16. The method of claim 15, wherein;

measuring the intensity of the electromagnetic radiation reflected from the target population of flakes having the second flake normal azimuth angle comprises measuring the intensity of the electromagnetic radiation reflected from the target population of flakes having the second flake normal azimuth angle in the specular plane.

17. The color measurement device of claim 1, wherein:

the first detector and the second detector are configured to measure the electromagnetic radiation produced by the same source at the same time.

18. A method of measuring color of a target coating comprising:

illuminating the target coating with a beam of electromagnetic radiation at an entrance angle, where a spherical coordinate system is used, where a surface of the target coating is a reference plane of the spherical coordinate system, an origin of the spherical coordinate system is about a point where the beam impacts the surface of the target coating, a zenith of the spherical coordinate system is a line normal to the surface of the target coating, wherein the entrance angle is a polar angle measured from the zenith, wherein the beam is defined with an azimuth angle of 0, wherein the target coating comprises flakes, wherein a target population of flakes is defined by all the flakes in the target population of flakes having the same angled flake normal polar angle, and wherein the beam illuminates the target population of flakes;

measuring an intensity of the electromagnetic radiation with a first detector positioned at a first polar angle measured from the zenith, wherein the first detector is positioned to receive electromagnetic radiation reflected from the beam by the target population of flakes;

measuring the intensity of the electromagnetic radiation with a second detector positioned at a second polar angle measured from the zenith, wherein the entrance angle for the source is the same for the position of the first detector and for the position of the second detector, wherein the second polar angle is different than the first polar angle, and wherein the second detector is positioned to receive electromagnetic radiation reflected from the beam by the target population of flakes; and wherein a specular line extends from the surface of the target coating at a specular angle, wherein the specular angle is the polar angle equal to the entrance angle, wherein the specular line has the azimuth angle of 180°, wherein a positive aspecular exit angle is defined between the specular line and a first exit line, wherein the first exit line extends from the first detector to the origin, and wherein a negative aspecular exit angle is defined between the specular line and a second exit line extending from the origin to the second detector, and wherein;

the negative aspecular exit angle is greater than the positive aspecular exit angle.

19. The method of claim 18, further comprising:

measuring the intensity of the electromagnetic radiation at a third polar angle, wherein the third polar angle is different than the first polar angle and the second polar angle.

* * * * *